United States Patent
Park

(10) Patent No.: US 9,883,481 B2
(45) Date of Patent: Jan. 30, 2018

(54) TELEMATICS CONTROL SYSTEM AND METHOD

(71) Applicant: Hyundai Motor Company, Seoul (KR)

(72) Inventor: Jong Rae Park, Gyeonggi-do (KR)

( * ) Notice: Subject to any disclaimer, the term of this patent is extended or adjusted under 35 U.S.C. 154(b) by 184 days.

(21) Appl. No.: 14/809,325

(22) Filed: Jul. 27, 2015

(65) Prior Publication Data

US 2016/0173157 A1     Jun. 16, 2016

(30) Foreign Application Priority Data

Dec. 16, 2014  (KR) .................. 10-2014-0180995

(51) Int. Cl.
| | | |
|---|---|---|
| *H04B 1/38* | (2015.01) | |
| *H04W 68/02* | (2009.01) | |
| *H04W 72/04* | (2009.01) | |
| *H04B 1/3822* | (2015.01) | |

(52) U.S. Cl.
CPC .......... *H04W 68/02* (2013.01); *H04B 1/3822* (2013.01); *H04W 72/0453* (2013.01)

(58) Field of Classification Search
CPC . H04B 1/3822; H04W 72/0453; H04W 68/02
See application file for complete search history.

(56) References Cited

U.S. PATENT DOCUMENTS

| | | | | |
|---|---|---|---|---|
| 5,794,149 A | * | 8/1998 | Hoo | ............... H04W 36/30 455/433 |
| 2013/0217384 A1 | | 8/2013 | Snider | |

FOREIGN PATENT DOCUMENTS

| | | |
|---|---|---|
| KR | 2004-0035038 A | 4/2004 |
| KR | 10-2007-0006130 A | 1/2007 |
| KR | 10-0999601 B1 | 12/2010 |
| KR | 10-1080780 | 11/2011 |
| KR | 10-2012-0067592 A | 6/2012 |
| KR | 2014-0059665 A | 5/2014 |
| KR | 10-2014-0091194 A | 7/2014 |

OTHER PUBLICATIONS

Park, Machine-Translation of KR10-2007-0006130, Nov. 7, 2011, 9 pages.*

* cited by examiner

*Primary Examiner* — Hoon J Chung
(74) *Attorney, Agent, or Firm* — Mintz Levin Cohn Ferris Glovsky and Popeo, P.C.; Peter F. Corless

(57) ABSTRACT

A telematics control system includes: a telematics unit in a vehicle including a modem unit that transmits vehicle information via an external mobile communication channel; and a telematics center transmitting and receiving channel change information of the modem unit based on a message indicating a channel state of a paging mode or a quick paging mode of a channel selected according to communication environment information acquired from the telematics unit.

11 Claims, 3 Drawing Sheets

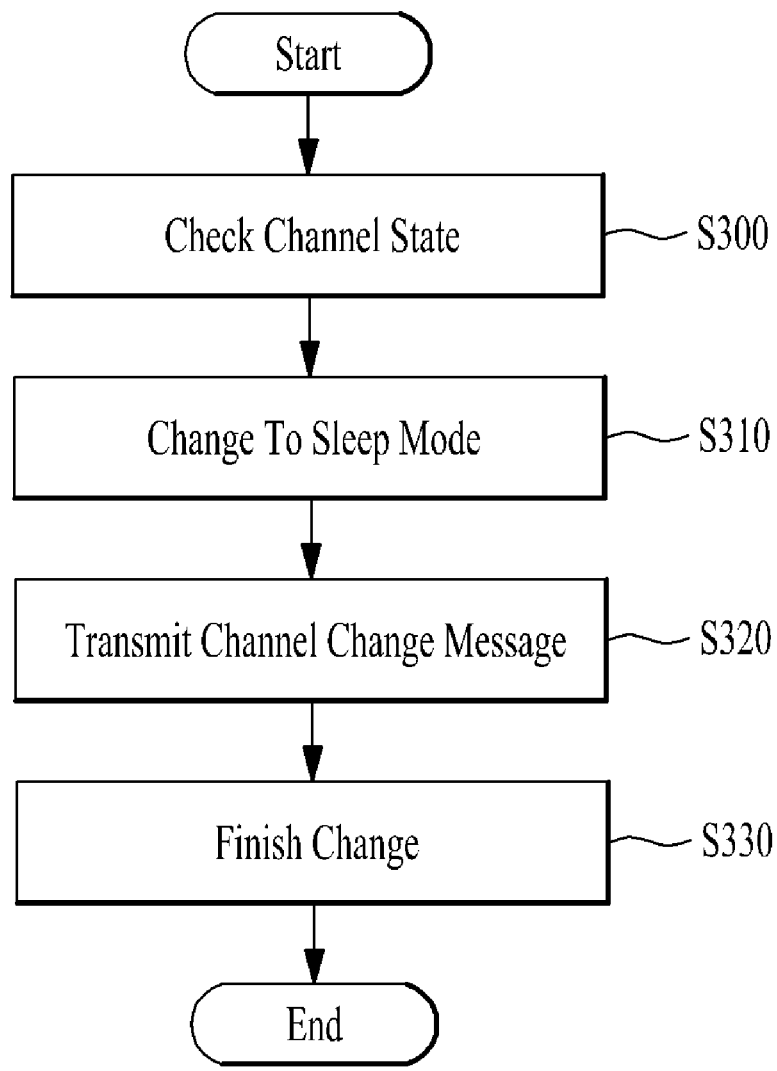

TELEMATICS CONTROL SYSTEM AND METHOD

CROSS-REFERENCE TO RELATED APPLICATION

This application claims priority to and the benefit of Korean Patent Application No. 10-2014-0180995, filed on Dec. 16, 2014, which is hereby incorporated by reference as if fully set forth herein.

BACKGROUND

Technical Field

The present disclosure relates to a telematics control system and method, and more particularly, to a telematics control system and method in which an element causing message transmission/reception delay uses a paging or quick paging channel in order to reduce change in radio frequency (RF) reception.

Discussion of the Related Art

As is well known, telematics is a compound word combining telecommunication and informatics. As an example, telematics services are capable of providing wireless service for issuing a voice command enabling vehicle drivers to use various wireless service functions, e.g., Internet access, e-mail transmission and reception, downloading of a digital video or audio file, acquisition of frequently changed traffic information, etc. Accordingly, in a telematics service, message transmission and reception states of a telematics unit and a telematics center may mismatch, thereby causing service delay and service failure.

SUMMARY

Accordingly, the present disclosure is directed to a telematics control system and method therefor that substantially obviate one or more problems due to limitations and disadvantages of the related art.

An object of the present disclosure is to provide a reliable telematics service by sharing a wireless sensitivity state of a telematics unit with a telematics center and controlling use of a communication channel of a wireless modem in the telematics unit to prevent message transmission and reception delay and failure. Additional advantages, objects, and features of the present disclosure will be set forth in part in the description which follows and in part will become apparent to those having ordinary skill in the art upon examination of the following or may be learned from practice of the disclosed embodiments. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a telematics control system includes: a telematics unit in a vehicle including a modem unit that transmits vehicle information via an external mobile communication channel; and a telematics center transmitting and receiving channel change information of the modem unit based on a message indicating a channel state of a paging mode or a quick paging mode of a channel selected according to communication environment information acquired from the telematics unit.

The modem unit may perform at least one of Long Term Evolution (LTE) communication, third-generation (3G) communication, and code division multiple access (CDMA) communication, such that the telematics unit and the telematics center are connected using external mobile communication.

The telematics unit may transmit electric field information of the modem unit, vehicle power-on state information, vehicle information, and mobile communication channel information to the telematics center.

The telematics center may monitor information about the telematics unit and change a channel of the modem unit, when service exchange with the telematics unit fails a predetermined amount of times or more.

The telematics unit may receive channel change information from the telematics center, change the channel of the modem unit to a channel belonging to a predetermined range and transmit the changed channel information to the telematics center.

The telematics center may transmit a message related to the changed channel information received from the telematics unit to the telematics unit or a mobile terminal of a driver.

The telematics unit may determine a communication channel state with the telematics center and change the communication channel of the modem unit to a quick paging mode in order to reduce vehicle battery power consumption.

The telematics unit may change the communication channel of the modem unit to a sleep mode according to a vehicle power-off state, after changing to the quick paging mode.

The telematics center may transmit a remote control message to the telematics unit in real-time in a vehicle power-off state and transmit a channel change message of the modem unit to the telematics unit when a telematics service execution message is not received.

The telematics unit may transmit state information based on a paging channel change of the modem unit to the telematics center.

Furthermore, according to embodiments of the present disclosure, a telematics control method includes: transmitting, by a telematics unit in a vehicle, electric field information of a modem unit included in the telematics unit, a vehicle power state information, vehicle information and mobile communication channel information to a telematics center when the vehicle is powered on; determining whether a service is exchanged between the telematics unit and the telematics center in real-time; transmitting a channel change command of the modem unit when an electric field level of the modem unit is less than a predetermined level in response to determining that the service is not exchanged in real-time; changing the channel of the modem unit based on the transmitted channel change command such that the telematics unit and the telematics center are connected in real-time; and transmitting the changed channel information of the modem unit to the telematics center.

Furthermore, according to embodiments of the present disclosure, a telematics control method includes: determining a communication channel state between a telematics unit in a vehicle and a telematics center via a modem unit in real-time when the vehicle is powered off; changing the modem unit to a sleep mode in order to reduce vehicle battery power consumption; transmitting a remote control message from the telematics center to the telematics unit; transmitting a channel change message of the modem unit to a mobile terminal of a driver when a telematics service execution message is not received; changing a channel of the modem unit; and transmitting state information of the modem unit to the telematics center.

The changing of the modem unit to the sleep mode may include changing the channel of the modem unit from a paging mode to a quick paging mode when the vehicle is powered off.

It is to be understood that both the foregoing general description and the following detailed description of the present disclosure are exemplary and explanatory and are intended to provide further explanation of the disclosed embodiments as claimed.

BRIEF DESCRIPTION OF THE DRAWINGS

The accompanying drawings, which are included to provide a further understanding of the present disclosure and are incorporated in and constitute a part of this application, illustrate embodiments of the disclosure and together with the description serve to explain the principle of the disclosure. In the drawings:

FIG. 3 is a flowchart illustrating a telematics control method in a vehicle power-off state according to the present disclosure.

DETAILED DESCRIPTION OF THE EMBODIMENTS

Figure 1:
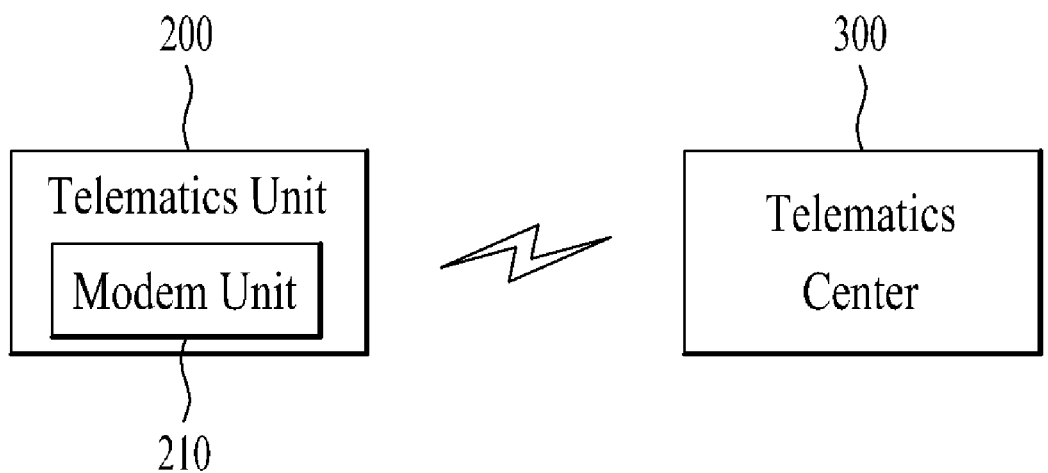
FIG. 1 is a block diagram showing the configuration of a telematics control system according to the present disclosure.

Hereinafter, the embodiments of the present disclosure will be described in detail with reference to the accompanying drawings so as to be easily implemented by those skilled in the art. It is noted that reference numerals are used to designate identical or similar elements throughout the several views. In describing the embodiments, if it is determined that the detailed description of a related known function or construction renders the scope of the present disclosure unnecessarily ambiguous, the detailed description thereof will be omitted. Some features shown in the figures may be exaggerated or reduced for ease of description, and the figures are not necessarily to scale. However, such details will be understood by those skilled in the art.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at a telematics unit. The "telematics unit" may incorporate a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the telematics unit in conjunction with one or more other components, as would be appreciated by a person of ordinary skill in the art.

Figure 2:
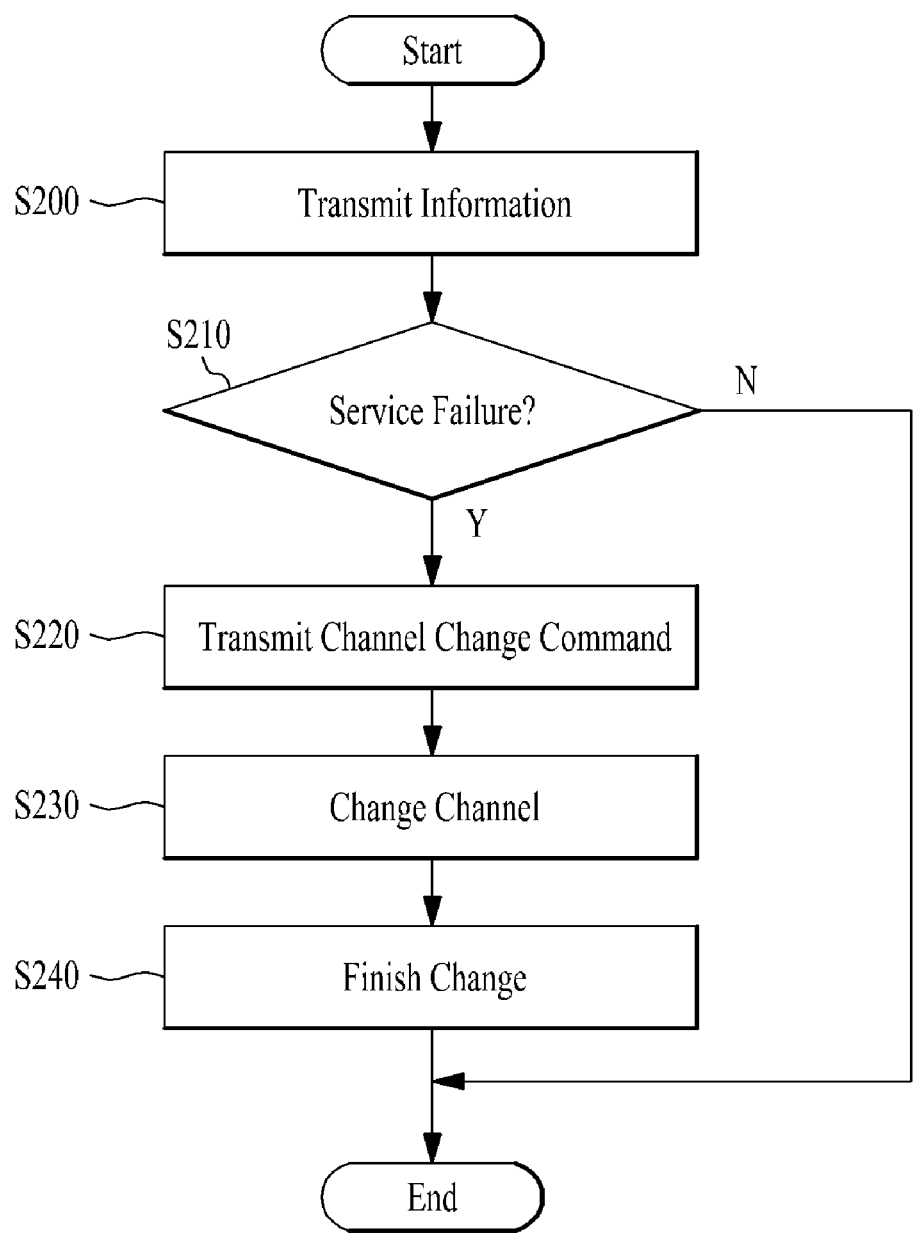
FIG. 2 is a flowchart illustrating a telematics control method in a vehicle power-on state according to the present disclosure.

Referring now to the disclosed embodiments, FIG. 1 is a block diagram showing the configuration of a telematics control system according to the present disclosure; FIG. 2 is a flowchart illustrating a telematics control method in a vehicle power-on state according to the present disclosure; and FIG. 3 is a flowchart illustrating a telematics control method in a vehicle power-off state according to the present disclosure.

As shown in FIG. 1, the telematics control system 100 includes a telematics unit 200, a modem unit 210 and a telematics center 300. Data created by the telematics center 300 according to a predetermined protocol and provided to the telematics unit 200 may include information classification and format, a variety of traffic information, accident information, a traffic condition including a traffic jam cause, etc. and data created by a vehicle according to a predetermined protocol and provided to the telematics unit 200 may include a current vehicle state and circumstances thereof, a traffic guidance request, etc.

The telematics unit 200 divides and defines message information transmitted from the telematics center 300 for use as vehicle information and data and includes system information, vehicle position and state information, system control or an information request or response information to a request. The telematics 200 transmits channel information to the telematics center 300 in real-time according to one or more of a Long Term Evolution (LTE) communication protocol, a third-generation (3G) communication protocol and a code division multiple access (CDMA) communication protocol and transmits electric field information of the modem unit 210, vehicle power state information, vehicle information, and mobile communication channel information to the telematics center 300 in real-time.

Accordingly, when the telematics unit 200 does not continuously receive a telematics service from the telematics center 300, the telematics center 300 monitors vehicle information provided by the telematics unit 200, compares an electric field level of the modem unit 210 with a predetermined electric field level and transmits a channel change command of the modem unit 210 to the telematics unit 200 if the electric field level of the modem unit 210 is less than the predetermined electric field level. The telematics unit 200 may receive a channel change message from the telematics center 300 and selectively change the channel of the modem unit 210 according to the channel change message received from the telematics center 300.

Subsequently, the telematics unit 200 may transmit the changed channel information of the modem unit 210 to the telematics center 300 and the telematics center 300 may transmit the channel information of the modem unit 210 to the telematics unit 200 or a mobile terminal of a driver or the telematics unit 200 such that the driver recognizes the changed channel information of the modem unit 210. The telematics unit 200 may also determine a communication channel state established with the telematics center 300 according to a vehicle power-off state. Although a quick page channel mode is present, a communication state between the telematics unit 200 and the telematics center 300 is determined in a paging channel mode, the modem unit is changed to a quick page mode, and the quick page mode is transmitted to the telematics center 300 and then is changed to a sleep mode, in order to reduce vehicle battery power consumption.

Subsequently, the telematics unit 200 receives a remote control message from the telematics center 300 in a vehicle power-off state and transmits a message for changing channel information to the mobile terminal of the driver when a service execution completion message is not received in real-time. The telematics unit 200 may transmit the changed paging channel information of the modem unit 210 to the telematics center 300, receive the channel information of the modem unit 210 and transmit the channel information of the modem unit 210 to the mobile terminal of the driver.

In order to receive a slot of a paging channel in a sleep mode according to a vehicle power-off state, the modem unit 210 receives a paging indication bit of a quick paging channel at a first allocated bit location from the telematics center 300, determines whether the paging indication bit at the first allocated bit location is '0' and wakes the telematics unit 200 if the paging indication bit is '1'. The modem unit 210 receives the allocated paging channel slot from the telematics center 300, determines a paging message according to a paging channel, and maintains the sleep mode until a paging indication bit of a quick paging channel of a next slot is received from the telematics center 300.

If the paging indication bit at the first allocated location is '0', the modem unit 210 receives a paging indication bit of a second allocated bit location from the telematics center 300, determines whether the paging indication bit at the second bit location is '0', and receives the paging indication bit at the allocated bit location from the telematics center 300 if the paging indication bit of the second allocated location is '0'. The modem unit 210 wakes the telematics unit 200 up if the second paging indication bit is '1', repeatedly transmits a predetermined number of paging indication bits of one slot of the quick paging channel and the telematics unit 200 maintains the sleep mode until paging indication bits of a next paging channel slot are received from the telematics center 300. The communication state between the telematics unit 200 and the telematics center 300 is determined in real-time depending on whether the vehicle is selectively powered on or off, thereby reducing vehicle battery power consumption.

A telematics control method of a vehicle power-on state according to the telematics control system 100 having the above-described configuration will now be described in detail. As shown in FIG. 2, the telematics unit 200 includes the modem unit 210, for transmitting vehicle information via an external mobile communication channel, and the telematics center 300 transmits and receives channel change information of the modem unit 210 according to the message related to the channel state of the paging mode or the quick paging mode of the channel selected according to communication environment information acquired from the telematics unit.

The telematics control method includes steps S200 through S240. In step S200, data transmitted from the telematics unit 200 to the telematics center 300 includes information classification, information format, a variety of vehicle information, etc. Additionally, in step S200, the telematics unit 200 divides and defines message information transmitted from the telematics center 300 for use as vehicle information and data and controls the vehicle using at least one of system information, vehicle position and state information, system control or an information request or response information to a request.

In step S210, whether the service is exchanged between the telematics unit 200 and the telematics center 300 is made in real-time, such that the telematics unit 200 transmits vehicle information to the telematics center 300 in real-time or the telematics center 300 transmits vehicle control data to the telematics unit 200.

In step S220, when telematics service exchange between the telematics unit 200 and the telematics center 300 continuously fails, the vehicle information received from the telematics unit 200 is monitored, the electric field level of the modem unit 210 is compared to the predetermined electric field level, and the telematics center 300 transmits the channel change command of the modem unit 210 if the electric field level of the modem 210 is less than the predetermined electric field level.

In step S230, the channel of the modem unit 210 is selectively changed according to the message including the channel change command received from the telematics center 300.

In step S240, the changed channel information of the modem unit 210 is transmitted to the telematics unit 200 or the mobile terminal of the driver such that the driver recognizes the channel information of the modem unit 210.

A telematics control method in a vehicle power-off state according to the telematics control system 100 having the above-described configuration will now be described in detail. As shown in FIG. 3, the telematics control method includes steps S300 through S330. In step S300, the communication channel state between the telematics unit 200 and the telematics center 300 is determined. Although a quick paging channel mode is present, the communication state between the telematics unit 200 and the telematics center 300 is determined in the paging channel mode.

In step S310, the modem unit is changed to the quick paging mode according to the communication channel state between the telematics unit 200 and the telematics center 300 that was determined (i.e., checked) in step S300. Then, the quick paging mode is transmitted to the telematics center 300 and then is changed to the sleep mode in step S320, in order to reduce vehicle battery power consumption.

In step S330, the changed paging channel information of the modem unit 210 is transmitted to the telematics center 300, the channel information of the modem unit 210 is received and transmitted to the mobile terminal of the driver.

According to a telematics control system and method of the present disclosure, since a communication configuration of a modem unit included in a telematics unit is controlled when a vehicle is powered on, it is possible to reduce vehicle battery power consumption. In addition, it is possible to execute a service within a predetermined time via reliable communication between the telematics unit and a telematics center.

It will be apparent to those skilled in the art that various modifications and variations can be made in the present disclosure without departing from the spirit or scope of the disclosure. Thus, it is intended that the present disclosure covers the modifications and variations of the disclosed embodiments provided they come within the scope of the appended claims and their equivalents.

What is claimed is:

1. A telematics control system comprising:
    a telematics unit in a vehicle including a modem unit that transmits vehicle information via an external mobile communication channel; and
    a telematics center transmitting and receiving channel change information of the modem unit based on a message indicating a channel state of a paging mode or a quick paging mode of a channel selected according to communication environment information acquired from the telematics unit, wherein
    the telematics center monitors information about the telematics unit and changes a channel of the modem unit, when service exchange with the telematics unit fails a predetermined amount of times or more, and
    the telematics unit receives channel change information from the telematics center, changes the channel of the modem unit to a channel belonging to a predetermined range, and transmits the changed channel information to the telematics center.

2. The telematics control system according to claim 1, wherein the modem unit performs at least one of Long Term Evolution (LTE) communication, third-generation (3G) communication, and code division multiple access (CDMA) communication, such that the telematics unit and the telematics center are connected using external mobile communication.

3. The telematics control system according to claim 1, wherein the telematics unit transmits electric field information of the modem unit, vehicle power-on state information, vehicle information, and mobile communication channel information to the telematics center.

4. The telematics control system according to claim 1, wherein the telematics center transmits a message related to the changed channel information received from the telematics unit to the telematics unit or a mobile terminal of a driver.

5. The telematics control system according to claim 1, wherein the telematics unit determines a communication channel state with the telematics center and changes the communication channel of the modem unit to a quick paging mode in order to reduce vehicle battery power consumption.

6. The telematics control system according to claim 5, wherein the telematics unit changes the communication channel of the modem unit to a sleep mode according to a vehicle power-off state, after changing to the quick paging mode.

7. The telematics control system according to claim 5, wherein the telematics center transmits a remote control message to the telematics unit in real-time in a vehicle power-off state and transmits a channel change message of the modem unit to the telematics unit when a telematics service execution message is not received.

8. The telematics control system according to claim 7, wherein the telematics unit transmits state information based on a paging channel change of the modem unit to the telematics center.

9. A telematics control method comprising:
    transmitting, by a telematics unit in a vehicle, electric field information of a modem unit included in the telematics unit, vehicle power state information, vehicle information and mobile communication channel information to a telematics center when the vehicle is powered on;
    determining whether a service is exchanged between the telematics unit and the telematics center in real-time;
    transmitting a channel change command of the modem unit when an electric field level of the modem unit is less than a predetermined level in response to determining that the service is not exchanged in real-time;
    changing the channel of the modem unit based on the transmitted channel change command such that the telematics unit and the telematics center are connected in real-time;
    transmitting the changed channel information of the modem unit to the telematics center;
    when service exchange with the telematics unit fails a predetermined amount of times or more, monitoring, by the telematics center, information about the telematics unit and changing, by the telematics center, a channel of the modem unit;
    receiving, by the telematics unit, channel change information from the telematics center;
    changing, by the telematics unit, the channel of the modem unit to a channel belonging to a predetermined range; and
    transmitting, by the telematics unit, the changed channel information to the telematics center.

10. A telematics control method comprising:
    determining a communication channel state between a telematics unit in a vehicle and a telematics center via a modem unit in real-time when the vehicle is powered off;
    changing the modem unit to a sleep mode in order to reduce vehicle battery power consumption;
    transmitting a remote control message from the telematics center to the telematics unit;
    transmitting a channel change message of the modem unit to a mobile terminal of a driver when a telematics service execution message is not received;
    changing a channel of the modem unit;
    transmitting state information of the modem unit to the telematics center;
    when service exchange with the telematics unit fails a predetermined amount of times or more, monitoring, by the telematics center, information about the telematics unit and changing, by the telematics center, a channel of the modem unit;
    receiving, by the telematics unit, channel change information from the telematics center;
    changing, by the telematics unit, the channel of the modem unit to a channel belonging to a predetermined range; and
    transmitting, by the telematics unit, the changed channel information to the telematics center.

11. The telematics control method according to claim 10, wherein the changing of the modem unit to the sleep mode comprises changing the channel of the modem unit from a paging mode to a quick paging mode when the vehicle is powered off.

* * * * *